United States Patent
Chen et al.

(10) Patent No.: US 12,373,556 B2
(45) Date of Patent: Jul. 29, 2025

(54) BOT ACTIVITY DETECTION FOR EMAIL TRACKING

(71) Applicant: Adobe Inc., San Jose, CA (US)

(72) Inventors: Xiang Chen, San Jose, CA (US); Yifu Zheng, Foster City, CA (US); Viswanathan Swaminathan, Saratoga, CA (US); Sreekanth Reddy, Bangalore (IN); Saayan Mitra, San Jose, CA (US); Ritwik Sinha, Cupertino, CA (US); Niranjan Kumbi, Pleasanton, CA (US); Alan Lai, Sacramento, CA (US)

(73) Assignee: Adobe Inc., San Jose, CA (US)

( * ) Notice: Subject to any disclaimer, the term of this patent is extended or adjusted under 35 U.S.C. 154(b) by 265 days.

(21) Appl. No.: 17/983,687

(22) Filed: Nov. 9, 2022

(65) Prior Publication Data

US 2024/0152605 A1 May 9, 2024

(51) Int. Cl.
| | |
|---|---|
| G06Q 10/107 | (2023.01) |
| G06F 21/55 | (2013.01) |
| G06Q 30/0201 | (2023.01) |
| G06Q 30/0242 | (2023.01) |

(52) U.S. Cl.
CPC ......... *G06F 21/554* (2013.01); *G06Q 10/107* (2013.01); *G06Q 30/0201* (2013.01); *G06Q 30/0246* (2013.01); *G06F 2221/034* (2013.01)

(58) Field of Classification Search
CPC .............. G06F 21/554; G06Q 10/107; G06Q 30/0201; G06Q 30/0246
See application file for complete search history.

(56) References Cited

U.S. PATENT DOCUMENTS

| | | | |
|---|---|---|---|
| 7,970,848 B2 | 6/2011 | Lin et al. | |
| 8,370,437 B2 | 2/2013 | Duffek et al. | |
| 10,938,770 B2 | 3/2021 | Chuhadar et al. | |
| 11,444,905 B1 * | 9/2022 | Murayama | H04L 51/48 |
| 2013/0117081 A1 * | 5/2013 | Wilkins | G06Q 30/0248 |
| | | | 705/14.4 |
| 2016/0140627 A1 | 5/2016 | Moreau et al. | |
| 2017/0017971 A1 | 1/2017 | Moreau et al. | |
| 2017/0345003 A1 * | 11/2017 | Spears | H04L 63/102 |
| 2020/0387819 A1 * | 12/2020 | Rogynskyy | H04L 51/212 |

OTHER PUBLICATIONS

Michael Walfish, J.D. Zamfirescu, Hari Balakrishnan, David Karger, and Scott Shenker, Distributed Quota Enforcement for Spam Control, May 9, 2006, NSDI, 3rd Symposium on Networked Systems Design & Implementation (Year: 2006).*

Honeypot (Computing), Available Online at: https://en.wikipedia.org/wiki/Honeypot_(computing), Dec. 2, 2022, 7 pages.

(Continued)

*Primary Examiner* — E Carvalho
(74) *Attorney, Agent, or Firm* — Kilpatrick Townsend & Stockton LLP (57) ABSTRACT

In some embodiments, techniques for identifying email events generated by bot activity are provided. For example, a process may involve applying bot detection patterns to identify bot activity among email response events.

20 Claims, 6 Drawing Sheets

(56) References Cited

OTHER PUBLICATIONS

IAB/ABC International Spiders and Bots List, Available Online at: https://www.iab.com/guidelines/iab-abc-international-spiders-bots-list/, 2016, 3 pages.

ReCAPTCHA v3, Available Online at: https://developers.google.com/recaptcha/docs/v3, Aug. 8, 2022, 4 pages.

Ahn et al., CAPTCHA: Using Hard AI Problems for Security, Proceedings of the 22nd International Conference on Theory and Applications of Cryptographic Techniques, 2003, 18 pages.

Bomhardt et al., Web Robot Detection—Preprocessing Web Logfiles for Robot Detection, New Developments in Classification and Data Analysis, 2005, pp. 113-124.

Dhamnani et al., Botcha: Detecting Malicious Non-Human Traffic in the Wild, Available Online at: https://ceur-ws.org/Vol-2758/OHARS-paper4.pdf, 2020, pp. 51-59.

Duskin et al., Distinguishing Humans from Robots in Web Search Logs: Preliminary Results Using Query Rates and Intervals, Proceedings of the 2009 workshop on Web Search Click Data, Feb. 2009, 5 pages.

Guo et al., Web Robot Detection Techniques Based on Statistics of Their Requested URL Resources, Proceedings of the Ninth International Conference on Computer Supported Cooperative Work in Design, May 24-26, 2005, pp. 1-3.

Kabe et al., Determining WWW User Agents from Server Access Log, Proceedings Seventh International Conference on Parallel and Distributed Systems: Workshops, Jul. 4-7, 2000, pp. 1-2.

Lu et al., Web Robot Detection Based on Hidden Markov Model, International Conference on Communications, Circuits and Systems, Jun. 25-28, 2006, pp. 1-3.

Tan et al., Discovery of Web Robot Sessions Based on Their Navigational Patterns, Data Mining and Knowledge Discovery, vol. 6, No. 1, Jan. 2002, pp. 9-35.

Adobe, Filtering Email Bot Activity, Available Online at: https://experienceleague.adobe.com/docs/marketo/using/product-docs/administration/email-setup/filtering-email-bot-activity.html?lang=en, Jul. 13, 2022, 3 pages.

\* cited by examiner

BOT ACTIVITY DETECTION FOR EMAIL TRACKING

TECHNICAL FIELD

This disclosure relates generally to email processing. More specifically, but not by way of limitation, this disclosure relates to detecting bot activity among email response events.

BACKGROUND

Email has become an essential tool for businesses to establish and continue contact with existing and potential customers. Analysis of email activity may be an important aspect of maintaining effective use of email resources.

SUMMARY

Certain embodiments involve applying bot detection patterns to identify bot activity among email response events. In some embodiments, for example, a bot-activity-detecting computing system is configured to process a stream of incoming events (e.g., in real time) to detect email response events that are due to bot activity.

The bot-activity-detecting computing system according to such an embodiment may include event caches that store email response events and a rule-matching module that evaluates the stored events to detect bot activity. For example, the rule-matching module may determine whether relations among activity types or timestamps of stored email response events match one or more bot detection patterns. The results of such determinations may be used to exclude email response events that were identified as bot activity from content to be displayed by a user interface (e.g., a list of email response events, an email response report, etc.).

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Techniques described herein include applying bot detection patterns to identify bot activity among email response events. In some embodiments, for example, a bot-activity-detecting computing system is configured to process a stream of incoming events (e.g., in real time) to detect email response events within the stream that are due to bot activity.

The bot-activity-detecting computing system according to such an embodiment may include event caches that allow the computing system to retrieve, for a given email response event, related email response events that were generated before the given event and after the given event. The bot-activity-detecting computing system may also include a rule-matching module that determine whether relations among the activity types or timestamps of the given event and the retrieved events match one or more bot detection patterns. The results of such determinations may be used to cause a user interface to exclude email response events that were identified as bot activity from content to be displayed.

By identifying email response events as bot activity, techniques described herein enable a practitioner to exclude such events from a corpus of collected email activities and thus to obtain a more reliable analysis and a more efficient response. For example, such techniques may include causing a user interface to display content that excludes email response events identified as bot activity.

In business-to-business (B2B) marketing, email is one of the most cost-effective channels of communication with existing and potential customers and is an essential tool for marketers to expand and accelerate their business. Interactions of email recipients (also called "leads") with the emails, such as opening the emails or clicking links in the emails, generate response events that indicate the recipients' level of interests in the products or promotions being offered in an email campaign. Based on leads' implicit feedback, new leads may be generated, or existing leads may be promoted to a next stage in the lead lifecycle.

However, not all email response events are generated from interactions by the actual leads. One type of recorded interaction occurs as follows: security software on the email servers that host the recipients' email accounts will open the emails and click the corresponding links in the emails to make sure the links are secure and do not present security threats. Such activities, which are known as email bot activities, will be recorded as email response events together with other normal lead activities. These bot activities will result in a false signal from the marketers' email campaigns and may trigger unnecessary engagement events in a lead lifecycle.

Consider, for example, an email service provider that helps a brand to distribute email communications to prospective customers and existing customers. The brand may want to track the engagement of their customers with the email communications, and the measurement of this engagement may help the brand to plan follow-up actions. For example, an email marketer of the brand may decide to conduct a campaign to send emails to prospective clients that announce a summit discussing the innovations in the products sold by the brand. In order to avoid customer fatigue, the marketer may want to send such emails only to those recipients who have opened any emails from the brand in the last month.

Unfortunately, determining such details of engagement presents a technical problem, as most email service providers exercise the option of scanning all received emails to detect malicious content. These clients will typically run bots that perform the following actions on the emails received: open, load images and text, and click on all available links. If the marketer mistakenly considers events generated in response to such opens from bots as real engagement from prospective clients, it runs the risk of wasting resources and reducing effectiveness by sending follow-up conversations to customers who may not be interested in the campaign.

To overcome this problem, it may be desired to identify events generated by activities (opens, clicks, etc.) that have been performed by bots, so that these can be filtered out as needed by the email marketer. Given the vast number of activities performed in email marketing, it is a challenging task for humans to determine whether each of those activities is a bot or not.

Several technical challenges are associated with addressing the above issue. Firstly, identifying the patterns of typical bot activities may require domain expertise knowledge in email marketing, as well as deep understanding of email activity data. Secondly, it may be desired to provide a live (e.g., real-time) detection system that is compatible with the entire email marketing data pipeline. As the email activities (e.g., including delivery, opens, and clicks) are recorded in a streaming manner, the bot detection system may be required to detect the bot activities from the streaming data. Given the large amount of data in email marketing, design of the bot detection system may require consideration of both the processing time and the memory cost. Finally, access to high-quality ground-truth data that can be used to train or validate a proposed method cannot be assumed.

Techniques described herein include a real-time bot detection system that may be implemented to address one or more of the above-mentioned issues. Such an approach may be implemented to detect bots from a stream of email activity data during ingestion time. Techniques may include an LRU (Least Recently Used) cache data structure, enabling performing evaluations very quickly (e.g., using hashing) and having very limited storage requirements. We implement a collection of several rules that collectively capture an extremely high proportion of bots (as validated from clicks on honeypot links). Honeypot links are hidden links within an email that are not visible to a human, so that corresponding link-clicks are unlikely to have been performed by a human and may be assumed to result from bot activity. The approach is unsupervised and does not need labeled ground-truth data (which can be very difficult for the bot detection problem), and it may also be applied to a stream of events retrieved from storage (e.g., in the order as originally received).

The algorithm is easy to compute and does not require long term historical data, and may operate on only a small cache (e.g., a few seconds) of the stream of email activity data. In this manner, the storage used by the implementation for several thousand customers tracking hundreds of millions of activities (or even billions of activities) is only a few gigabytes. The changes are non-destructive, only adding a new attribute that can be used to filter activities. For example, a new campaign can be launched that only sends a follow-up message those activities that open an email but are not labeled as a bot. The method is unsupervised, which means that a reliable label for activities is not needed. Hence this approach is easily transferable to any email customer.

Figure 1:
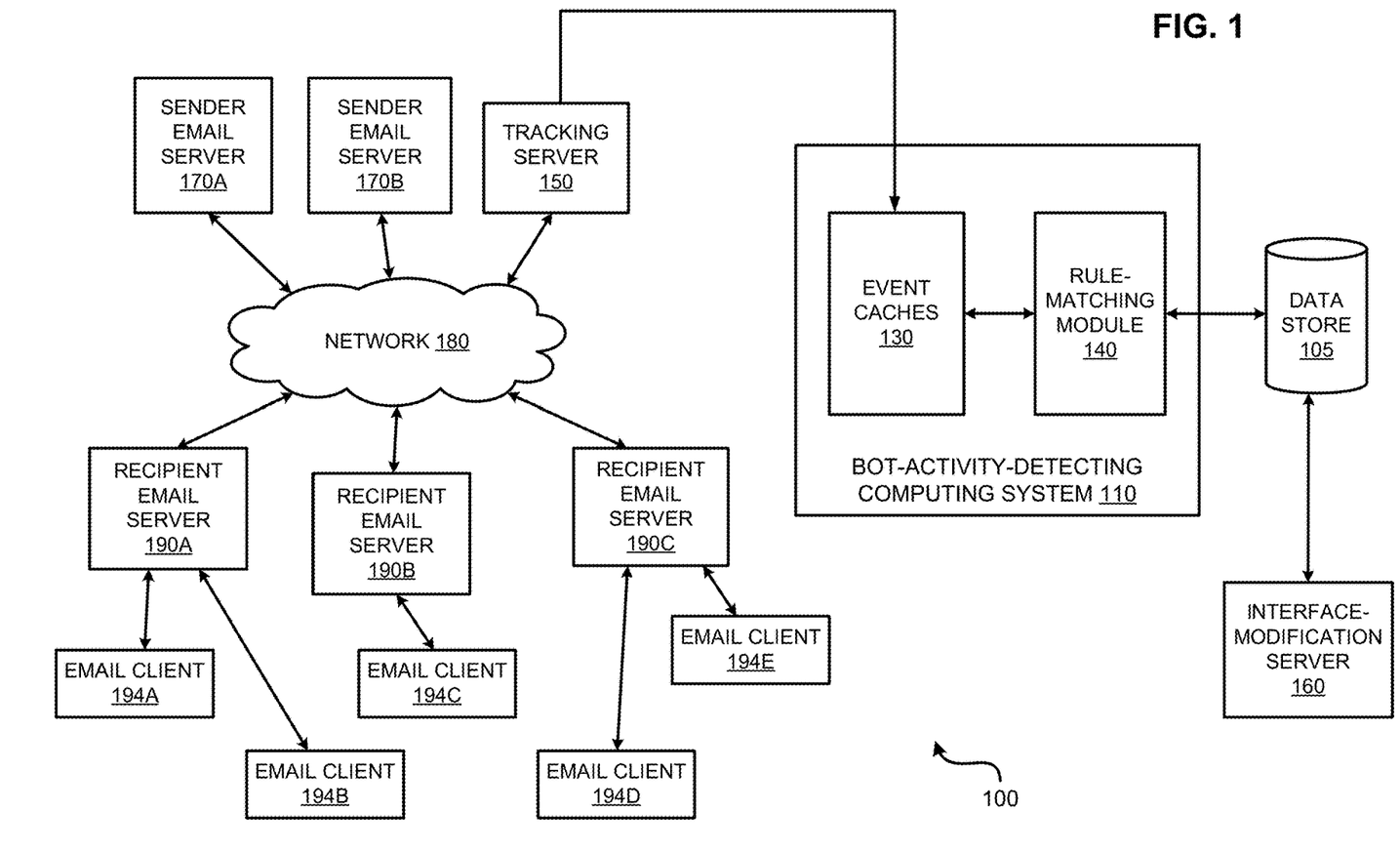
FIG. 1 depicts an example of a computing environment in which a bot-activity-detecting computing system employs event caches and a rule-matching module to identify email response events generated by bot activity, and an interface-modification server excludes email response events that were identified as bot activity from content to be displayed by a user interface, according to certain embodiments of the present disclosure.

Referring now to the drawings, FIG. 1 is an example of a computing environment 100 in which a bot-activity-detecting computing system employs event caches and a pattern-matching module to identify email events generated by bot activity, according to certain embodiments of the present disclosure. The computing environment 100 also includes an interface-modification server to modify a user interface of the computing environment.

In various embodiments, the computing environment 100 includes a bot-activity-detecting computing system 110, a data store 105, a tracking server 150, and an interface-modification server 160. The computing environment 100 also includes one or more sender email servers (e.g., sender email servers 170A and 170B) that send emails to email clients 194A-194E over network 180. The computing environment 100 also includes one or more recipient email servers (e.g., recipient email servers 190A-C) that receive the emails for forwarding to the respective email clients. The recipient e-mail servers 190A-C or the email clients 194A-194E may perform actions relating to the emails, such as, for example, accepting delivery of the email, opening the email, clicking on a link in the email, etc. These actions may cause corresponding email response events to be reported back to the tracking server 150. The network 180 may be a local-area network (LAN), a wide-area network (WAN), the Internet, or any other networking topology known in the art that connects the sender email servers 170A and 170B and the tracking server 150 with the recipient e-mail servers 190A-C.

For example, accepting delivery of an email by the email client 194A or by the associated recipient email server 190A may cause the server 190A to send a delivery notification to the tracking server 150. When the recipient opens an email via the email client 194A, this action may cause the server 190A to access a Uniform Resource Locator (URL) link embedded within the email that is associated with the tracking server 150. Similarly, when the recipient clicks on a link in the email, this action may cause the server 190A to send a Hypertext Transfer Protocol (HTTP) request to a URL that is associated with the tracking server 150. In each case, the email response event reported back to the tracking server 150 may include information that identifies the email or the intended recipient of the email. Such information may be used to determine the recipient's interest in the email or in a particular portion of the content of the mail.

Figure 2A:
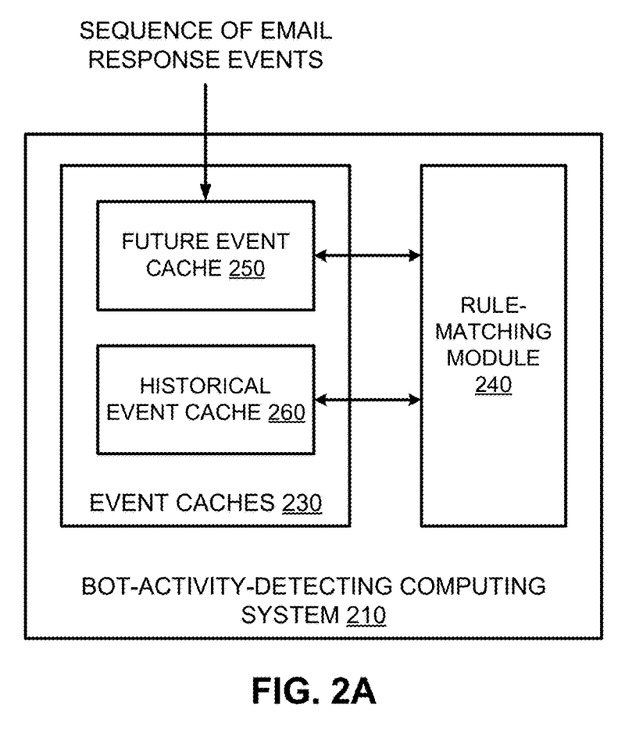
FIG. 2A depicts a block diagram of an embodiment of a bot-activity-detecting computing system, according to certain embodiments of the present disclosure.

FIG. 2A shows a diagram of an implementation 210 of the bot-activity-detecting computing system 110, according to certain embodiments of the present disclosure. In this example, an implementation 230 of the event cache 130 includes a future event cache 250 and a historical event cache 260, which may each be implemented as a least-recently-used (LRU) cache (e.g., including a hashmap and a linked list). In certain embodiments, one or both of the future event cache 250 and the historical event cache 260 are implemented in volatile memory (e.g., random-access memory). The future event cache 250 is configured to store a sequence of email response events (e.g., in real-time). Each incoming email response event may have at least the following elements: a timestamp, a lead identifier (e.g., email address), a campaign identifier, and an activity type (e.g., "delivery," "open", or "link-click"). The size of the future event cache 250 may be configured according to a predetermined length of time (e.g., a number of seconds, such as four or five seconds), such that when an event arrives, it is stored in the future event cache 250 for the predetermined length of time, and then is evicted and processed. An implementation 240 of the rule-matching module 140 is configured to retrieve, for a given email response event, related email response events that were generated before the given event (from the future event cache 250) and after the given event (from the historical event cache 260).

Figure 2B:
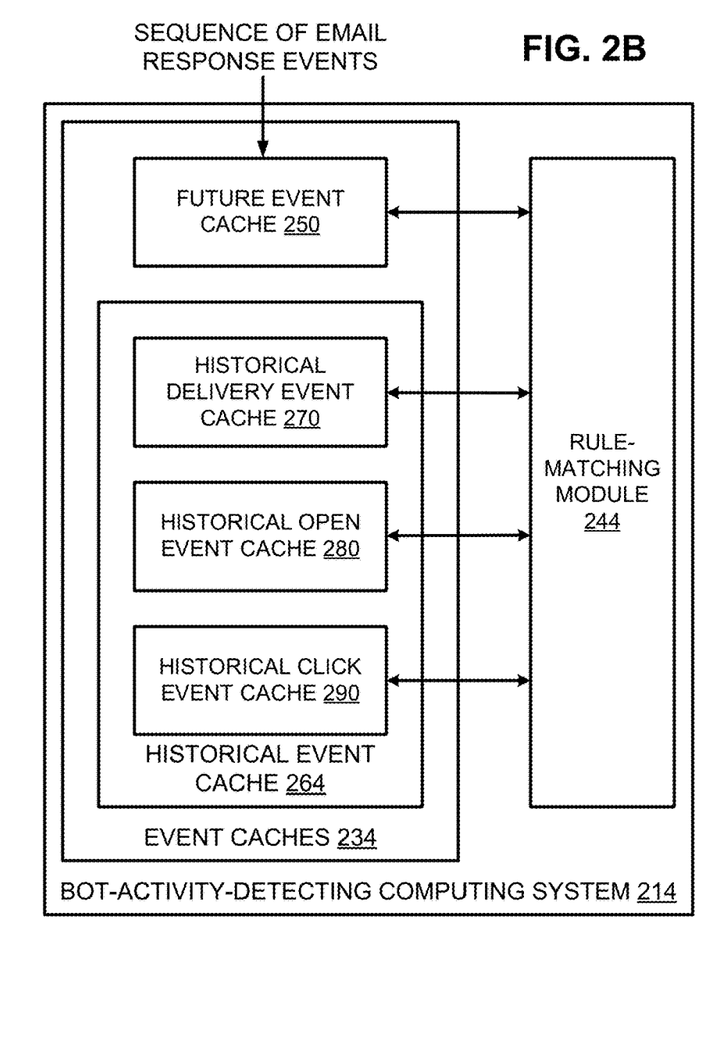
FIG. 2B depicts a block diagram of another embodiment of a bot-activity-detecting computing system, according to certain embodiments of the present disclosure.

FIG. 2B shows a diagram of an implementation 214 of the bot-activity-detecting computing system 210, according to certain embodiments of the present disclosure. In this example, an implementation 234 of the event caches 230 includes an implementation 264 of the historical event cache 260 that includes three caches: a historical delivery event cache 270, a historical open event cache 280, and a historical click event cache 290. Each of the three caches of the historical event cache 260 may be implemented as an LRU cache (e.g., in volatile memory). Unlike the future event cache 250 (which may be sized according to a selected length of time, as described above), each of the three caches of the historical event cache 260 may be sized according to a corresponding selected capacity (e.g., 500,000, one million, or two million events), which may be the same or different for each of the three caches. Therefore, while the future event cache 250 may store events from only the last few seconds, the caches of the historical event cache 260 may store events from the last few hours or even from the last few days. The bot-activity-detecting computing system 210 also includes an implementation 244 of the rule-matching module 240 that is configured to retrieve email response events from each of the four caches of the event caches 234.

Figure 3:
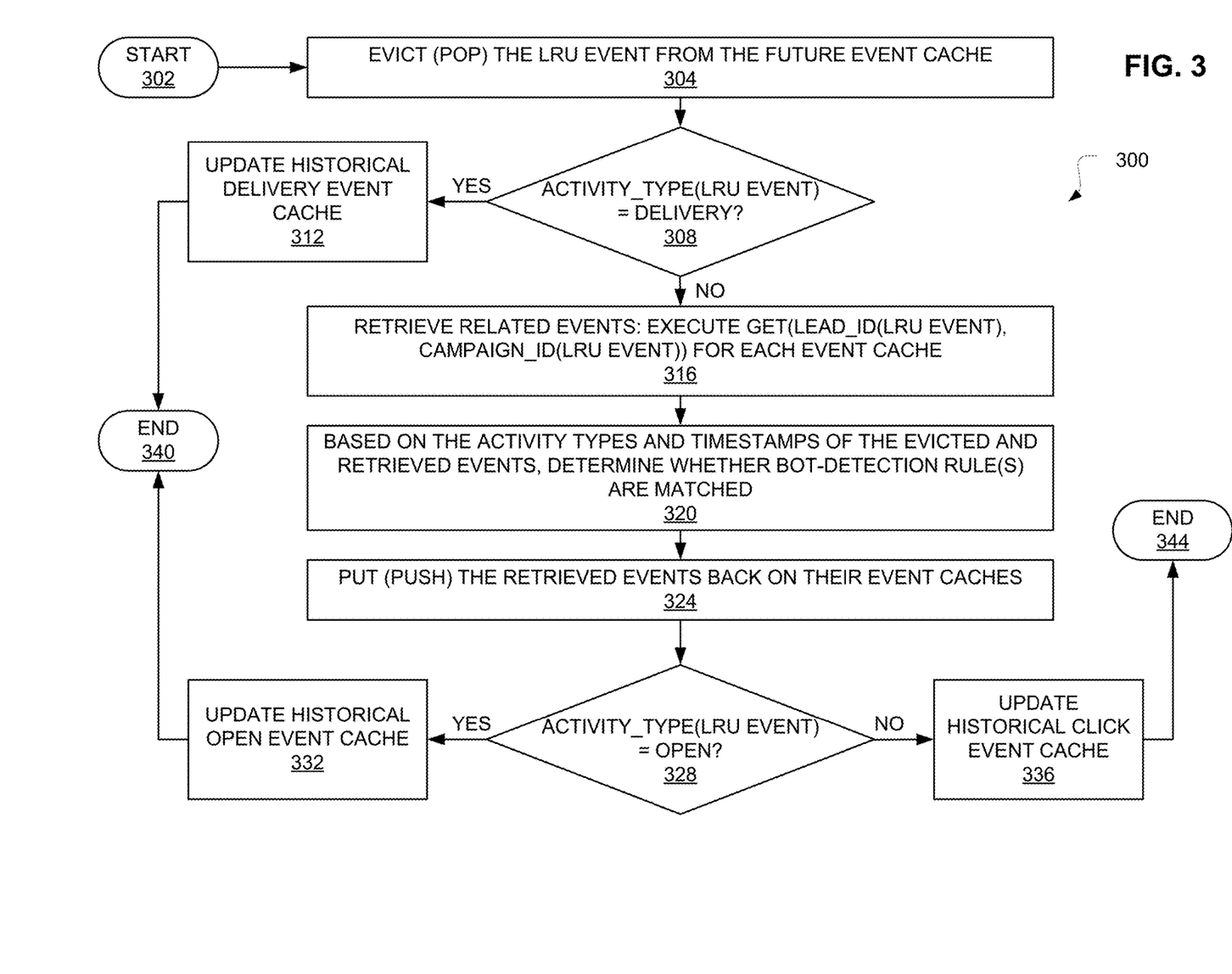
FIG. 3 depicts a flow diagram for a bot detection routine according to certain embodiments of the present disclosure.

FIG. 3 shows a flowchart for a bot detection routine 300 according to certain embodiments of the present disclosure. One or more computing devices (e.g., the bot-activity-detecting computing system 110) implement operations depicted in FIG. 3 by executing suitable program code. For example, the rule-matching module 244 may be implemented to perform the bot detection routine 300.

The routine 300 starts at block 302. At block 304, the routine 300 involves evicting (e.g., popping) an event from the future event cache according to its arrival time, in a first-in-first-out (FIFO) manner (e.g., so that the cached events are processed sequentially). At block 308, the routine 300 involves determining whether the activity type of the evicted event ("least-recently-used (LRU) event") is "delivery." If the LRU event is a delivery event, then at block 312, the routine 300 involves updating the historical delivery event cache with the LRU event, and at block 340, the routine 300 terminates. The delivery event may also be logged and/or persistently stored (e.g., in the data store 105).

If the LRU event is not a delivery event (e.g., the LRU event is an open event or a link-click event), then at block 316, the routine 300 involves retrieving related email response events. For example, the routine 300 may involve executing the function get(key) for each event cache (e.g., the future event cache, the historical delivery cache, the historical open cache, and the historical link-click cache), where the key includes at least one of a lead identifier of the LRU event and a campaign identifier of the LRU event.

At block 320, the routine 300 involves determining, based on the activity types and timestamps of the LRU and retrieved email response events, whether one or more bot-detection rules are matched. The routine 300 may also store (e.g., in the data store 105) a result of the determining (e.g., as a value of a tag associated with the LRU event, as an indication of which rule or rules were matched for the LRU event, etc.).

At block 324, the routine 300 involves pushing the retrieved email response events back on their respective event caches. For example, the routine 300 may involve executing the function put(key,value) for each retrieved event.

At block 328, the routine 300 may involve determining whether the activity type of the LRU event is "open." In this case, if the LRU event is an open event, then at block 332, the routine 300 may involve updating the historical open event cache with the LRU event (and possibly persistently storing the LRU event, such as in the data store 105), and at block 340, the routine 300 may terminate. If the LRU event is not an open event (e.g., the LRU event is a link-click event), then at block 336, the routine 300 may involve updating the historical link-click event cache with the LRU event, and at block 344, the routine 300 may terminate.

Alternatively, at block 328, the routine 300 may involve determining whether the activity type of the LRU event is "link-click." In this case, if the LRU event is a link-click event, then at block 332, the routine 300 may involve updating the historical link-click event cache with the LRU event, and at block 340, the routine 300 may terminate. If the LRU event is not a link-click event (e.g., the LRU event is an open event), then at block 336, the routine 300 may involve updating the historical open event cache with the LRU event, and at block 344, the routine 300 may terminate.

Figure 4:
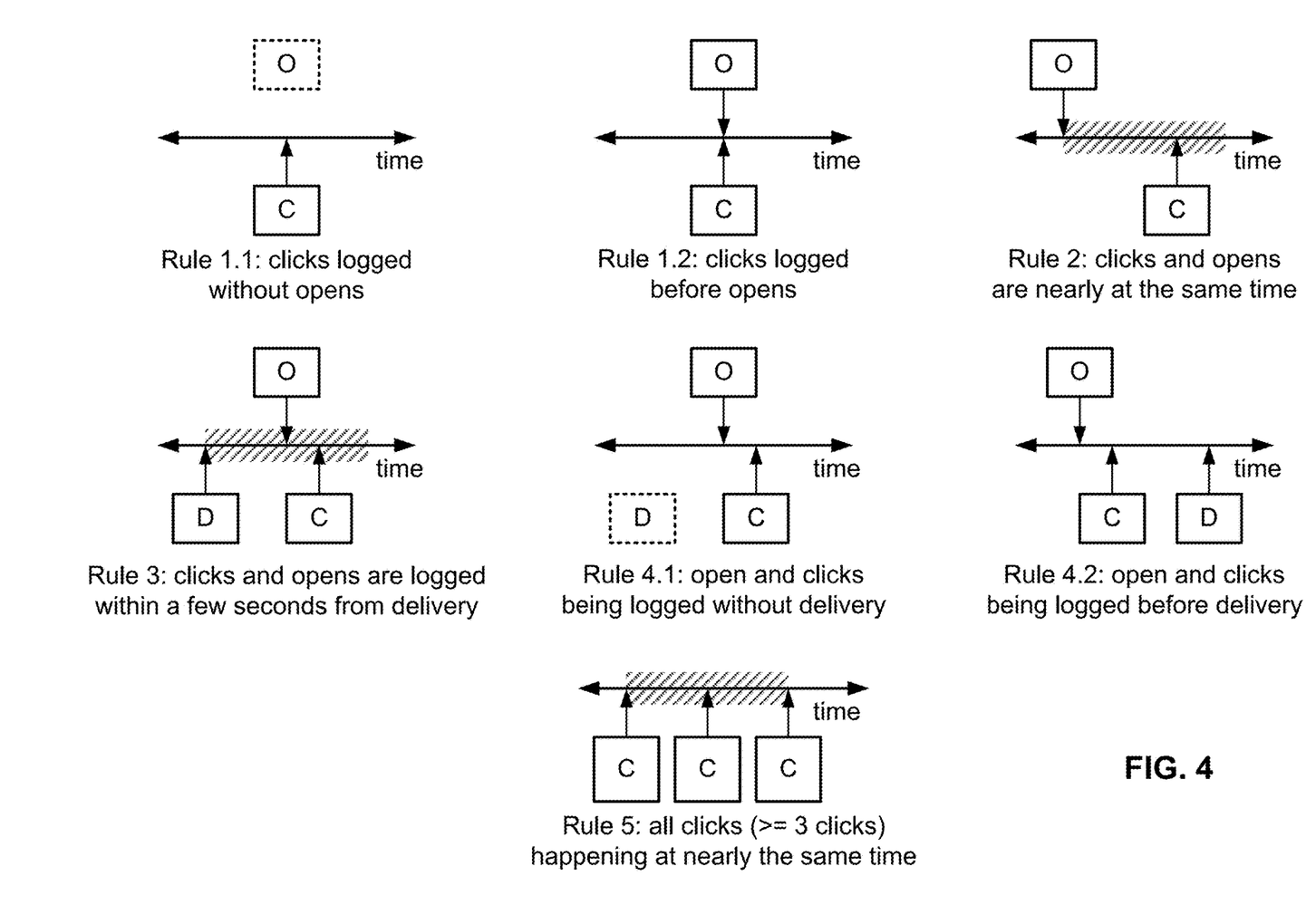
FIG. 4 shows several examples of bot detection rules, according to certain embodiments of the present disclosure.

FIG. 4 shows several examples of bot detection rules (also called "bot patterns") that may be applied (e.g., in block 320 as described above). Rule 1.1 ("clicks logged without opens") is matched when the pool of email response events (that is to say, the LRU and retrieved email response events as described above with reference to routine 300) includes at least one link-click event and no open events. In this case, the pool may or may not include a delivery event. The operation of determining whether this rule is matched may include using the lead identifier of the LRU event to check a persistent store of open events (in, for example, data store 105), to fetch matching open event(s), and to update the historical open cache with the fetched open event(s).

Rule 1.2 ("clicks logged before opens (delta=0)") is matched when the pool of email response events includes an open event and a link-click event whose timestamps have the same value. In this case, the pool may or may not include a delivery event or other open or link-click events.

Rule 2 ("clicks and opens are nearly at the same time (delta=1)") is matched when the pool of email response events includes an open event and a link-click event whose timestamps are within a specified time interval from each other. That is, the magnitude of the difference between the timestamp of the open event and the timestamp of the link-click event is not greater than a specified threshold value (e.g., one second, two seconds, or three seconds). In this case, the pool may or may not include a delivery event or other open or link-click events.

Rule 3 ("clicks and opens are logged within a few seconds after delivery (delta=1)") is matched when the pool of email response events includes a delivery event, an open event, and a link-click event whose timestamp is later than and not more than a few seconds after (e.g., not more than one, two, or three seconds after) the timestamp of the delivery event. In this case, the pool may or may not include other open or link-click events.

Rule 4.1 ("open and clicks being logged without delivery") is matched when the pool of email response events includes at least one link-click or open event and no delivery events. The operation of determining whether this rule is matched may include using the lead identifier of the LRU event to check a persistent store of delivery events (in, for example, data store 105), to fetch matching delivery event(s), and to update the historical delivery cache with the fetched delivery event(s).

Rule 4.2 ("open and clicks being logged before delivery") is matched when the pool of email response events includes a delivery event and at least one open or link-click event whose timestamp is earlier than the timestamp of the delivery event. In this case, the pool may or may not include other open or link-click events.

Rule 5 ("all clicks (>=n clicks) happening at nearly the same time (delta=1)") is matched when the pool of email response events includes at least n link-click events (where the value of n is, e.g., two, three, or four) whose timestamps are within a specified time interval from each other. For example, this rule may be matched when the number of events that occur within a specified time window (e.g., one second, two seconds, or three seconds) of the current email response event (e.g., as determined by comparing the timestamps of each of the number of events with the timestamp of the current email response event) is greater than or equal to (n−1). In this case, the pool may or may not include other link-click events and may or may not include a delivery event or an open event.

A bot detection routine (e.g., as described above with reference to block 420) may be configured such that a selected bot detection rule (e.g., one of the seven example rules as described above) is applied at each instance of the routine. Alternatively, the bot detection routine may be configured such that a selected combination of bot detection rules (e.g., more than one of the seven example rules as described above) is applied at each instance of the routine. One example of a selected combination of bot detection rules that may be applied at each instance of the bot detection routine is Rules 1.1, 1.2, 2, 3, 4.1, 4.2, and 5. Another example of a selected combination of bot detection rules that may be applied at each instance of the bot detection routine is Rules 1.1, 1.2, 2, and 5. A selected combination of bot detection rules may be applied such that an email response event will be indicated as a bot activity if it is matched with any of the rules within the combination.

Figure 5:
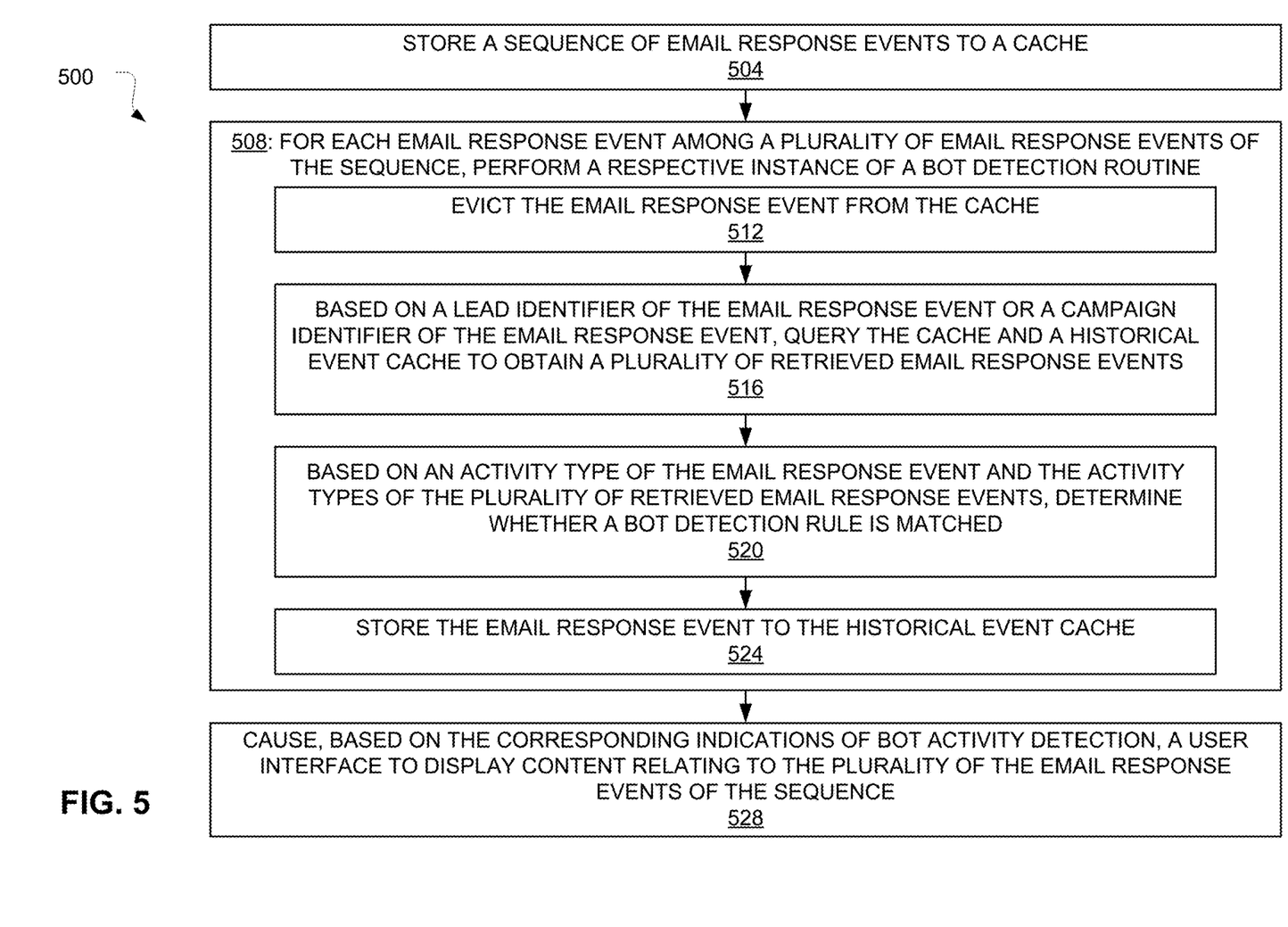
FIG. 5 depicts an example of a process for processing email response events, according to certain embodiments of the present disclosure.

FIG. 5 depicts an example of a process 500 for processing email response events, according to certain embodiments of the present disclosure. One or more computing devices (e.g., the bot-activity-detecting computing system 110) implement operations depicted in FIG. 5 by executing suitable program code. For illustrative purposes, the process 500 is described with reference to certain examples depicted in the figures. Other implementations, however, are possible.

At block 504, the process involves storing a sequence of email response events to a cache, wherein the sequence includes a plurality of email response events. The plurality of email response events may include, for example, a plurality of open events and a plurality of link-click events.

At block 508, the process involves performing, for each email response event among the plurality of email response events, a respective instance of a bot detection routine, wherein the routine is described at sub-blocks 512, 516, 520, and 524. At block 512, the process involves evicting the email response event from the cache. For example, evicting the email response event from the cache at block 512 may be performed by an operation that pops the least-recently-used entry from the cache according to its arrival time, in a first-in-first-out (FIFO) manner.

At block 516, the process involves, based on at least one of a lead identifier of the email response event or a campaign identifier of the email response event, querying the cache and a historical cache to obtain a plurality of retrieved email response events. Each of the plurality of retrieved email response events has a timestamp and an activity type. At block 520, the process involves, based on a timestamp of the email response event, an activity type of the email response event, and the timestamps and activity types of the plurality of retrieved email response events, determining whether a bot detection rule is matched. For each email response event of at least some of the plurality of the email response events (e.g., email response events for which the determining indicates that a bot detection rule is matched), block 520 also includes storing a corresponding indication of bot activity detection for the email response event. At block 524, the process involves storing the email response event to the historical cache.

At block 528, the process involves causing, based on the corresponding indications of bot activity detection, a user interface to display content relating to the plurality of the email response events of the sequence. The displayed content may include, for example, information on one or more leads or campaigns that is based on a set of email response events that includes events for which a corresponding indication of bot activity detection was not stored and excludes events for which a corresponding indication of bot activity detection was stored.

Example of a Computing System for Implementing Certain Embodiments

Figure 6:
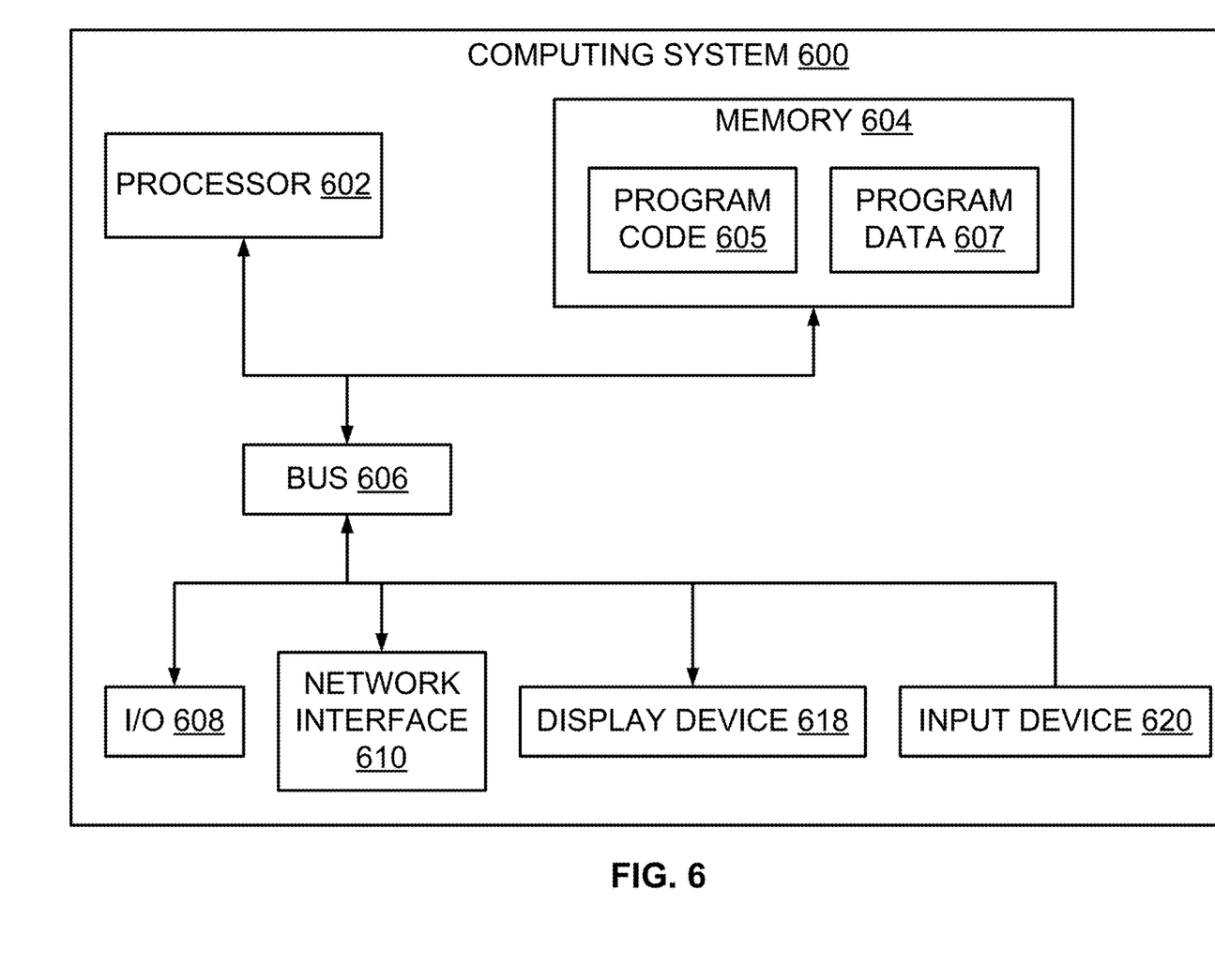
FIG. 6 depicts an example of a computing system for implementing certain embodiments of the present disclosure.

Any suitable computing system or group of computing systems can be used for performing the operations described herein. Although the bot-activity-detecting computing system 110, the tracking server 150, and the interface-modification server 160 are described as different components, the functions of these components may be implemented using any number of machines, including one (e.g., may be implemented using one or more machines). For example, FIG. 6 depicts an example of the computing system 600, according to certain embodiments of the present disclosure. The implementation of computing system 600 could be used to implement a bot-activity-detecting computing system 110. In other embodiments, a single computing system 600 having devices similar to those depicted in FIG. 6 (e.g., a processor, a memory, etc.) combines the one or more operations and data stores depicted as separate systems in FIG. 1.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit (ASIC), a field-programmable gate array (FPGA), or any other suitable processing device. The processor 602 can include any number of processing devices, including a single processing device.

A memory device 604 includes any suitable non-transitory computer-readable medium for storing program code 605, program data 607, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 600 executes program code 605 that configures the processor 602 to perform one or more of the operations described herein. Examples of the program code 605 include, in various embodiments, the application executed by the rule-matching module 140, the application executed by the interface-modification server 160, or other suitable applications that perform one or more operations described herein. The program code may be resident in the memory device 604 or any suitable computer-readable medium and may be executed by the processor 602 or any other suitable processor.

In some embodiments, one or more memory devices 604 stores program data 607 that includes one or more datasets and models described herein. Examples of these datasets include email response events, corresponding indications of bot activity detection, etc. In some embodiments, one or more of data sets, models, and functions are stored in the same memory device (e.g., one of the memory devices 604). In additional or alternative embodiments, one or more of the programs, data sets, models, and functions described herein are stored in different memory devices 604 accessible via a data network. One or more buses 606 are also included in the computing system 600. The buses 606 communicatively couple one or more components of a respective one of the computing system 600.

In some embodiments, the computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and/or the like. The computing system 600 is able to communicate with one or more other computing devices (e.g., a user computing device 190) via a data network using the network interface device 610.

The computing system 600 may also include a number of external or internal devices, an input device 620, a presentation device 618, or other input or output devices. For example, the computing system 600 is shown with one or more input/output (I/O) interfaces 608. An I/O interface 608 can receive input from input devices or provide output to output devices. An input device 620 can include any device or group of devices suitable for receiving visual, auditory, or other suitable input that controls or affects the operations of the processor 602. Non-limiting examples of the input device 620 include a touchscreen, a mouse, a keyboard, a microphone, a separate mobile computing device, etc. A presentation device 618 can include any device or group of devices suitable for providing visual, auditory, or other suitable sensory output. Non-limiting examples of the presentation device 618 include a touchscreen, a monitor, a speaker, a separate mobile computing device, etc.

Although FIG. 6 depicts the input device 620 and the presentation device 618 as being local to the computing device that executes the one or more applications noted above, other implementations are possible. For instance, in some embodiments, one or more of the input device 620 and the presentation device 618 can include a remote client-computing device that communicates with the computing system 600 via the network interface device 610 using one or more data networks described herein.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Additionally, the use of "or" is meant to be open and inclusive, in that "or" includes the meaning "and/or" unless specifically directed otherwise. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:
1. A method of processing email response events, the method comprising:
   storing a sequence of email response events to a cache, wherein the cache is a least-recently-used (LRU) cache comprising a first hashmap; and for each email response event among a plurality of the email response events of the sequence, performing a respective instance of a bot detection routine, the routine comprising:
  evicting the email response event from the cache;
  based on at least one of a lead identifier of the email response event or a campaign identifier of the email response event, querying the cache and a historical event cache to obtain a plurality of retrieved email response events, wherein each of the plurality of retrieved email response events has an activity type, wherein the historical event cache is an LRU cache comprising a second hashmap;
  based on an activity type of the email response event and the activity types of the plurality of retrieved email response events, determining whether a bot detection rule is matched; and
  storing the email response event to the historical event cache;
wherein, for each email response event of at least some of the plurality of the email response events, the determining whether a bot detection rule is matched includes storing a corresponding indication of bot activity detection for the email response event; and
wherein the method further comprises causing, based on the corresponding indications of bot activity detection, a user interface to display content relating to the plurality of the email response events of the sequence.

2. The method of claim 1, wherein, for each of the respective instances of the bot detection routine, evicting the email response event from the cache comprises removing a LRU event from the cache, wherein the LRU event is the email response event.

3. The method of claim 1, wherein, for each of the respective instances of the bot detection routine:
  each of the plurality of retrieved email response events has a timestamp, the plurality of retrieved email response events having a plurality of timestamps, and
  the determining whether a bot detection rule is matched is based on a timestamp of the email response event and the plurality of timestamps of the plurality of retrieved email response events.

4. The method of claim 1, wherein the plurality of the email response events comprises a plurality of open events and a plurality of link-click events.

5. The method of claim 4, wherein the sequence of email response events comprises a plurality of delivery events.

6. The method of claim 1, wherein:
  the historical event cache comprises a historical open event cache and a historical link-click event cache; and
  for each of the respective instances of the bot detection routine, storing the email response event to the historical event cache comprises storing the email response event, according to the activity type of the email response event, to one among the historical open event cache or the historical link-click event cache.

7. The method of claim 6, wherein:
  the historical event cache further comprises a historical delivery event cache, and
  querying the historical event cache comprises querying the historical delivery event cache, querying the historical open event cache, and querying the historical link-click event cache.

8. The method of claim 1, wherein, for each of the respective instances of the bot detection routine, the routine further comprises, for each retrieved email response event among the plurality of retrieved email response events, returning the retrieved email response event to its respective cache as a most-recently-used entry.

9. The method of claim 1, wherein, for each of the respective instances of the bot detection routine, determining whether a bot detection rule is matched comprises determining that timestamps of at least three click events among the email response event and the plurality of retrieved email response events are within three seconds of each other.

10. The method of claim 9, wherein, for each of the respective instances of the bot detection routine, determining whether a bot detection rule is matched comprises determining that the email response event is a click event and that none among the plurality of retrieved email response events is an open event.

11. A non-transitory computer-readable medium having program code that is stored thereon, the program code executable by one or more processing devices for performing operations comprising:
  storing a sequence of email response events to a cache, wherein the cache is a least-recently-used (LRU) cache comprising a first hashmap;
  for each email response event among a plurality of the email response events of the sequence, performing a respective instance of a bot detection routine, the routine comprising:
    evicting the email response event from the cache;
    based on at least one of a lead identifier of the email response event or a campaign identifier of the email response event, querying the cache and a historical event cache to obtain a plurality of retrieved email response events, wherein each of the plurality of retrieved email response events has an activity type, wherein the historical event cache is an LRU cache comprising a second hashmap;
    based on an activity type of the email response event and the activity types of the plurality of retrieved email response events, determining whether a bot detection rule is matched; and
    storing the email response event to the historical event cache; and
  wherein, for each email response event of at least some of the plurality of the email response events, the determining whether a bot detection rule is matched includes storing a corresponding indication of bot activity detection for the email response event.

12. The non-transitory computer-readable medium of claim 11, wherein the operations further comprises causing, based on the corresponding indications of bot activity detection, a user interface to display content relating to the plurality of the email response events of the sequence.

13. The non-transitory computer-readable medium of claim 11, wherein, for each of the respective instances of the bot detection routine, evicting the email response event from the cache comprises removing an event from the cache in a first-in-first-out manner, wherein the removed event is the email response event.

14. The non-transitory computer-readable medium of claim 11, wherein, for each of the respective instances of the bot detection routine:
  each of the plurality of retrieved email response events has a timestamp, the plurality of retrieved email response events having a plurality of timestamps, and
  the determining whether a bot detection rule is matched is based on a timestamp of the email response event and the plurality of timestamps of the plurality of retrieved email response events.

15. The non-transitory computer-readable medium of claim 11, wherein:
the plurality of the email response events comprises a plurality of open events and a plurality of link-click events, and
the sequence of email response events comprises a plurality of delivery events.

16. A system comprising:
a future event cache configured to store a sequence of email response events; and
a rule-matching module configured to perform, for each email response event among a plurality of the email response events of the sequence, a respective instance of a bot detection routine, the routine comprising:
evicting the email response event from the future event cache, wherein the future event cache is a least-recently-used (LRU) cache comprising a first hashmap;
based on at least one of a lead identifier of the email response event or a campaign identifier of the email response event, querying the future event cache and a historical event cache to obtain a plurality of retrieved email response events, wherein each of the plurality of retrieved email response events has an activity type;
based on an activity type of the email response event and the activity types of the plurality of retrieved email response events, determining whether a bot detection rule is matched; and
storing the email response event to the historical event cache, wherein the historical event cache is an LRU cache comprising a second hashmap;
wherein, for each email response event of at least some of the plurality of the email response events, the determining whether a bot detection rule is matched includes storing a corresponding indication of bot activity detection for the email response event; and
wherein the system further comprises an interface-modification server configured to cause, based on the corresponding indications of bot activity detection, a user interface to display content relating to the plurality of the email response events of the sequence.

17. The system of claim 16, wherein:
the historical event cache comprises a historical open event cache and a historical link-click event cache; and
for each of the respective instances of the bot detection routine, storing the email response event to the historical event cache comprises storing the email response event, according to the activity type of the email response event, to one among the historical open event cache or the historical link-click event cache.

18. The system of claim 17, wherein:
the historical event cache further comprises a historical delivery event cache, and
querying the historical event cache comprises querying the historical delivery event cache, querying the historical open event cache, and querying the historical link-click event cache.

19. The system of claim 16, wherein, for each of the respective instances of the bot detection routine, determining whether a bot detection rule is matched comprises determining that timestamps of at least three click events among the email response event and the plurality of retrieved email response events are within three seconds of each other.

20. The system of claim 19, wherein, for each of the respective instances of the bot detection routine, determining whether a bot detection rule is matched comprises determining that the email response event is a click event and that none among the plurality of retrieved email response events is an open event.

* * * * *